Feb. 7, 1967   L. H. MORIN   3,303,256
METHOD OF ORIENTING AND FEEDING TRAVELER
INSERTS TO MOLDING MACHINES
Filed Sept. 5, 1963   2 Sheets-Sheet 1
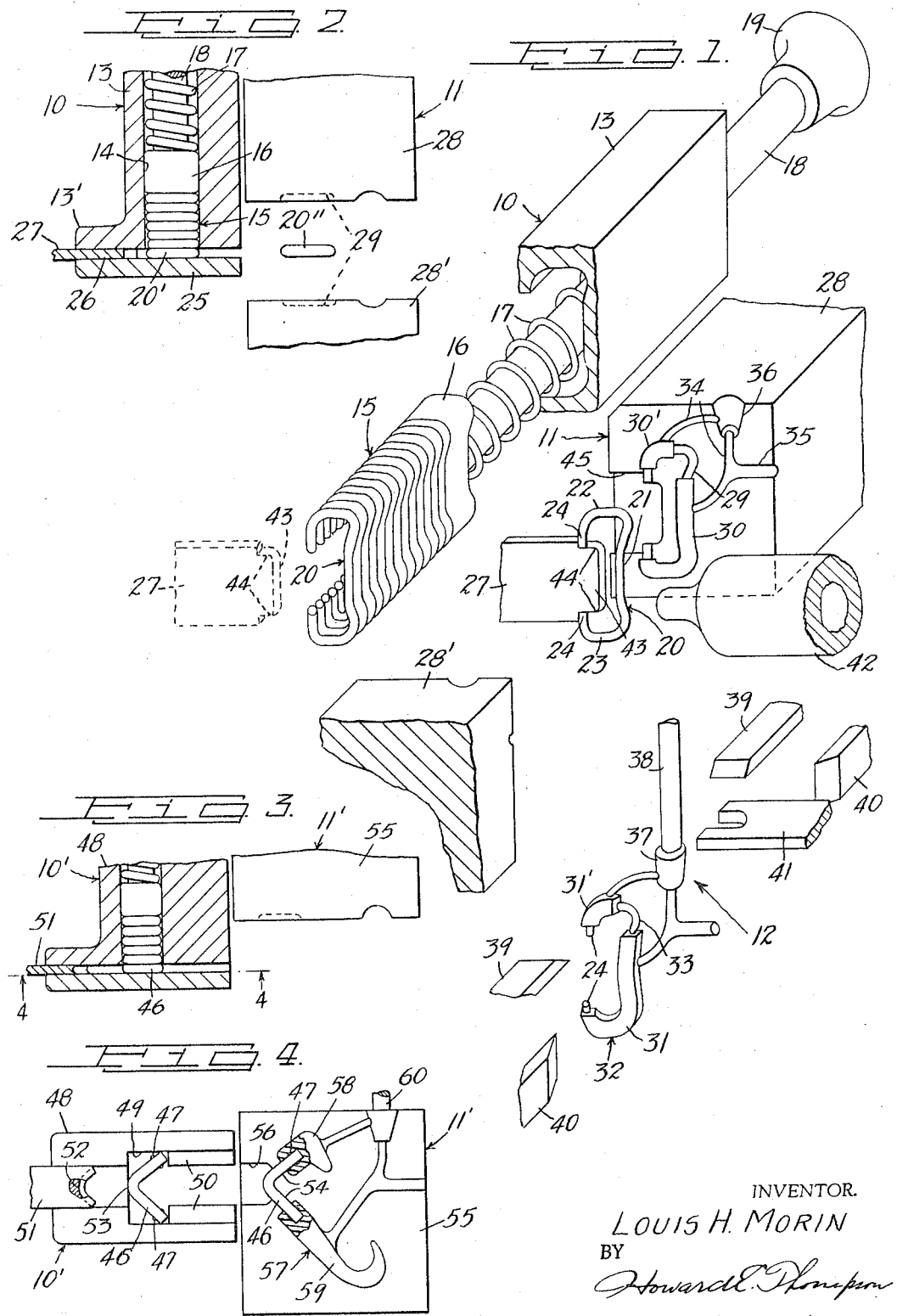
INVENTOR.
LOUIS H. MORIN
BY
Howard E. Thompson
ATTORNEY

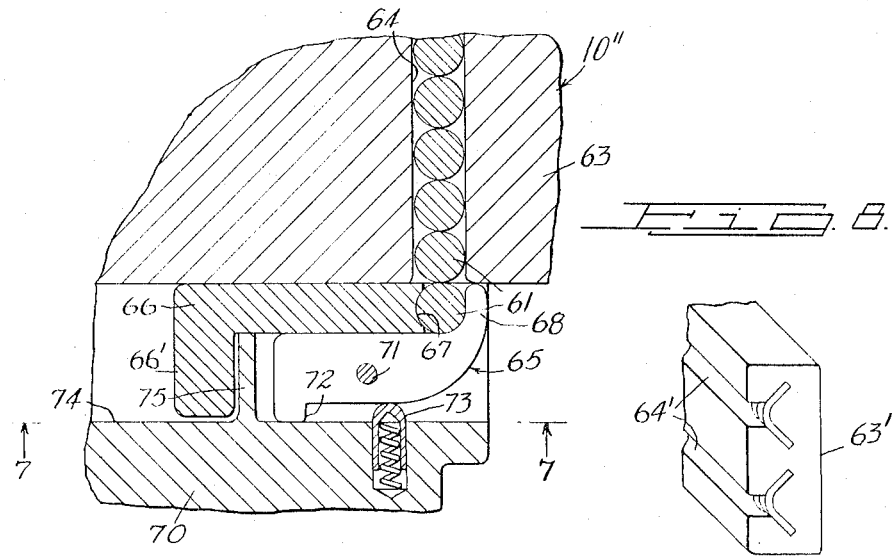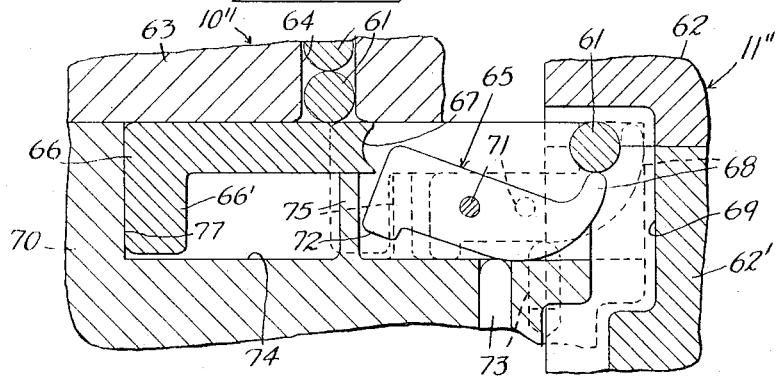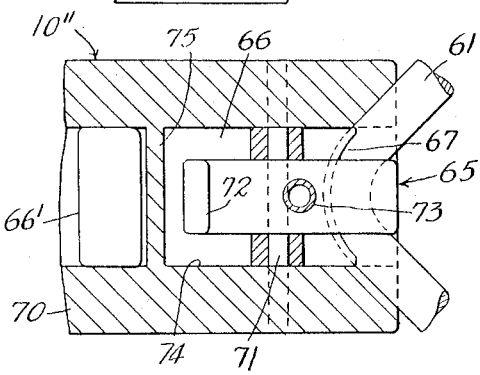

United States Patent Office 3,303,256
Patented Feb. 7, 1967

3,303,256
METHOD OF ORIENTING AND FEEDING TRAVELER INSERTS TO MOLDING MACHINES
Louis H. Morin, Bronx, N.Y., assignor to Coats & Clark Inc., New York, N.Y., a corporation of Delaware
Filed Sept. 5, 1963, Ser. No. 306,859
1 Claim. (Cl. 264—275)

This invention deals with plastic molding machines for molding plastic travelers, wherein inserts are employed and the plastic portion of the traveler is molded directly upon the insert. More particularly, the invention deals with a method of supporting and/or orienting a plurality of inserts at an insert delivery and pickup station, from which inserts are picked up one at a time by a pickup and delivery rod for movement and positioning of the insert between a pair of dies at a molding station, preparatory to molding the plastic portion or portions of the traveler upon the insert.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an exploded diagrammatic perspective view illustrating the several stations employed in forming a resultant plastic traveler, including an insert portion.

FIG. 2 is a diagrammatic plan and sectional view of the delivery and pickup station and the molding station.

FIG. 3 is a view, similar to FIG. 1, showing a modified type and kind of insert.

FIG. 4 is a view looking generally along the line 4—4 of FIG. 3 and illustrating a molded traveler on the face of the die, with parts of the molded portions of the traveler shown in section.

FIG. 5 is a diagrammatic sectional view of a modified form of delivery and pickup station.

FIG. 6 is a view like FIG. 5 illustrating delivery of an insert to a molding station, generally similar to the die illustrated in FIG. 4, the dies of the molding station being modified to suit the insert delivery means employed.

FIG. 7 is a view looking generally in the direction of the line 7—7 of FIG. 5; and FIG. 8 is a detailed perspective view of a modified form of insert supporting magazine of a delivery and pickup station.

In forming plastic moldings of various types and kinds employing inserts, the problem has existed for the handling and delivery of an insert for positioning in a pre-oriented position between a pair of dies, preparatory to performing the molding operation upon the insert.

In illustrating one adaptation and use of my invention, I have illustrated the method of first orienting a number of inserts at a delivery and pickup station, the latter including means for movement of an insert from this station to predetermined position between a pair of dies at a molding station, preparatory to forming the molded plastic portion or portions of a traveler upon the insert in forming the resulting end product. The method further includes means for transferring the molded traveler from the molding station to a combined trimming and stripper station spaced with respect to said molding station.

Considering FIG. 1 of the drawing, 10 generally identifies the insert delivery and pickup station and at 11 is indicated the molding station and at 12 is indicated the trimming and stripper station.

The station 10 includes a magazine 13, in the channel 14 of which are suitably positioned a predetermined number of oriented inserts, as diagrammatically seen by the group, block or column 15. These can be suitably delivered to the channel 14 when the pusher or plunger 16 is in retracted position in the magazine against the action of a spring 17. This operation can be performed by providing on the shaft 18 of the pusher a fingerpiece knob 19. In some instances, the group, block or column 15 of oriented inserts 20 can be maintained in assembled relationship by shellac or other medium to facilitate handling thereof and positioning in the channel 14.

In the construction shown, each insert has a central shank portion 21, with hook end portions 22 and 23 terminating in inwardly directed ends 24. Note in this connection the showing of one insert at the molding station 11 in FIG. 1.

Turning now to FIG. 2 of the drawing, in this figure, the forward or discharge end of the magazine 13 is diagrammatically shown in section, with the pusher or plunger 16 supporting an end insert, as at 20', against an outer plate 25 of the magazine, between which plate and the end portion 13' of the magazine is a channel 26, in which a pusher rod or pickup and delivery rod 27 is slidably mounted, so as to pick up the insert positioned at 20' and deliver the same to a position, as indicated at 20" between a pair of dies 28, 28' at the molding station 11. The position of an insert at 20" is also illustrated in the diagrammatic showing in FIG. 1 of the drawing. This positioning brings the insert in the pre-oriented position for proper registration with cavity portions 29 of the dies, the dies having other cavity portions 30, 30' forming the plastic molded portions 31, 31' on the resulting end product traveler 32, which is shown at the trimming and stripper station 12 of FIG. 1, prior to performance of the trimming and stripper operations. It will appear that the final end product 32 has a rounded portion of the insert 20 exposed between 31, 31', as seen at 33, with the ends 24 of the insert projecting beyond 31 and 31'.

Adjacent surfaces of the dies also include runner cavities 34 extending to the cavities 30, 30' and a gate cavity 35 and a cavity 36 forming a molded portion 37 on a transfer core pin 38, the latter being utilized to move the molded traveler from the molding station 11 to position at the trimming and stripper station 12, so that pairs of trimming tools 39 and 40 can remove the runners, as will be apparent; whereas, the stripper plate 41 is moved over and engages 37 in stripping 38 from 37. It will be apparent that both the trimmed end product 32 and the removed runner portions can be collected in suitable receptacles positioned below the station 12. At 42 I have illustrated the injection nozzle which is moved into engagement with the gate 35 in the pressure injection of the molding material into the cavities 30, 30' and the other associated cavities, as will be apparent.

Returning now to the pickup and delivery rod 27, the pickup of this rod has a projection 43 forming two rounded shoulder portions 44, the spacing of which is slightly greater than the normal spacing between the ends 24 of the insert, keeping in mind that the inserts are formed of spring wire as and when the end 43 of the rod 27 engages the end insert 20', as in FIG. 2. The ends 24 will be snapped over the shoulders 44 to positively retain the insert on the rod 27 and, as the rod 27 advances to move from the station 10 to the station 11, the insert will be displaced from its position 20' and stripped from its adjacent insert as and when shellac or other adhesion between the inserts is employed and then delivered to the alined position at the molding station 11, suitable means being employed to control this feed of the rod 27. When the insert is at the position 20" of FIG. 2, the same will be in registering alinement with the cavities 29 in the dies, so that, when the dies are brought into closed position, the insert will be held by the dies. In this connection, it will appear from a consideration of FIG. 1 of the drawing that the dies have recesses, one of which is shown at 45, for reception of the end of the rod 27, so that, when the insert is gripped by the dies, the rod 27 can be retracted or, in other words, moved to the dotted line position, diagrammatically seen in FIG. 1, at which position, the end of the channel 14 is cleared and another insert will assume the position 20' of FIG. 2, preparatory to the next cycle of operation, such as previously described.

Considering FIGS. 3 and 4 of the drawing, I have diagrammatically shown another adaptation of my invention in picking up and delivering a modified form of insert 46, generally L-shaped in form and having adjacent its terminal ends laterally projecting key beads 47. In these figures, the delivery and pickup station is indicated at 10' and the molding station is indicated at 11'. The pickup station 10' is generally similar to the station 10 and differs primarily, in that the magazine 48 includes a deep channel 49, in which the inserts 46 are supported, the inserts being held in position by inwardly projecting cleats 50, as clearly noted in FIG. 4 of the drawing. The station 10' further includes a modified form of pickup and delivery rod 51, the end of which has a V-groove, as at 52, to engage the rounded central portion 53 of the insert. With this construction, the rod 51, at least in part, can include a permanent magnet, so that, when the insert is engaged by the rod 51, it will be magnetically held in its pre-oriented position and, in this position, delivered into registering alinement with cavity portions 54 of a pair of dies, only one of the dies being shown at 55 in FIGS. 3 and 4 of the drawing. The dies also have recesses, as at 56, for reception of the end of the rod 51, the same as with the teachings in FIG. 1 of the drawing. With the structure shown in FIGS. 3 and 4, the plastic molded portions of the resulting traveler 57 are shown at 58 and 59 mounted on and secured against displacement from the key beaded end portions of the insert, as diagrammatically seen in FIG. 4 of the drawing. In FIG. 4, I have indicated, in part, the transfer core 60, similar to the core 38, for transferring the molded traveler to a trimming and stripper station, as diagrammatically illustrated in FIG. 1 of the drawing.

In FIGS. 5, 6 and 7, I have shown another method of procedure, wherein inserts 61, generally similar to the inserts 46 of FIGS. 3 and 4, are employed. 10" represents, in part, the delivery and pickup station, from which the inserts are picked up and delivered to dies 62, 62' of a molding station 11", shown, in part, in FIG. 6 of the drawing.

In FIGS. 5, 6 and 7, I have shown another method of magazine of the station 10", including the channel 64, through which the inserts are delivered to the insert pickup mechanism employed which, in the construction shown, comprises a finger 65 and a clamping gripper 66, the latter having a circular cutout gripper end 67 adapted to engage the rounded central portion of the insert 61 when positioned beyond the channel 64, as will be apparent from a consideration of FIG. 5 of the drawing. The finger 65 has a rounded hook end 68, in which the insert seats in movement of the insert from the station 10" to the station 11", as illustrated in FIG. 6 of the drawing, in other words, in alinement with cavity portions of the dies 62, 62' the same as illustrated, for example, in FIG. 6 of the drawing, the dies being recessed, as seen at 69, to receive 65 and 66, as well as the pusher or feed slide 70 of the insert delivery mechanism.

The finger 65 is pivoted in the slide, as seen at 71, the finger having an offset heel 72 checking movement of the finger into its normal position, as seen in FIG. 5 of the drawing. Mounted in the feed slide 70 is a spring actuated pin 73 for normal support of the finger in the position shown in FIG. 5 of the drawing. The gripper 66 is generally L-shaped in form, in other words, has a short leg 66' which operates in a channel portion 74 of the slide 70. The slide 70 includes a raised wall 75 for support of the gripper on the surface of the magazine 63.

The surface of the gripper 66 has the curved gripper face 67 conforming to the contour of the insert and operates to securely hold the insert in the hook end 68 of the finger 65. The operation of the structure shown in FIGS. 5 and 6 is as follows.

The gripper 66 is first moved by suitable means to grip the insert positioned, as seen in FIG. 5, between 67 and 68. Now the entire assemblage is advanced by movement of the slide 70, which brings the slide into the position shown in FIG. 6, in which position, the gripper 66 and finger 65 support the insert in properly alined position between the dies 62, 62', which are then in open position; whereupon, the dies close and grip the insert 61, after which, the gripper is moved to the left, as indicated in full lines in FIG. 6, this movement being checked by engagement of the gripper with the wall 77 of the slide. This movement of the gripper frees the finger 65 for movement into the position shown in full lines in FIG. 6; whereupon, the slide 70 and the gripper 66 return to a position which brings the finger 65 into the position shown in FIG. 5 and the gripper retracted sufficiently to clear the channel 64, permitting another insert to drop into the position shown in FIG. 5. It will be understood that, in the retracted movement of the slide 70, the spring actuated pin 73 automatically returns the finger to the position of FIG. 5 immediately after the curved end 68 of the finger clears the insert gripped in the dies. The assemblage is now in position for the next successive cycle of operation. It will be understood that the molding operation upon the insert takes place promptly after the insert is gripped in the dies and during the retracted movement of the slide, above described.

In FIG. 8 of the drawing, I have diagrammatically illustrated, in part, a modified form of magazine 63', which would be generally similar to the magazine 63, with the exception that two channels 64' would be provided therein for supporting two oriented groups, blocks or columns of inserts for delivery to two molding stations, it being understood that the channels 64' are sufficiently spaced to clear die cavities, where the dies would have two traveler molding stations, the dies being modified in having runners directed to the two cavity stations of the dies.

With the showings in FIGS. 3 to 8, inclusive, it will be understood that the inserts can be grouped in any desired manner in the respective delivery and pickup stations, or assembled in blocks or columns where the oriented inserts are adhered to each other.

Having fully described my invention, what I claim as new and desire to secure by Letters Patent is:

The method of producing molded plastic products having inserts, which consists in orienting a group of separate inserts at a delivery and pickup station, depositing an insert in a slidable pickup device between a slidable element and a pivoted element on said device to hold said insert therebetween, moving said device with said insert between said elements from said pickup station to a pair of recessed separable die members, closing said die members to grip said insert therebetween in molding position without gripping said pickup device, withdrawing said pickup device from said dies, successively moving said slidable element and then said pivoted element around its pivot to release said insert during said withdrawal of said device, pressure injecting plastic material into said dies to form one of said molded products with said insert molded therein, and moving said pickup device back toward said pickup station to there engage between said elements the next insert preparatory to moving it to the dies for the molding of the next product.

References Cited by the Examiner

UNITED STATES PATENTS

| | | |
|---|---|---|
| 2,931,063 | 4/1960 | Harris. |
| 2,966,026 | 12/1960 | Morin _____ 264—271 |
| 2,973,556 | 3/1961 | Morin _____ 264—297 |
| 3,141,914 | 7/1964 | Morin _____ 264—275 |
| 3,151,359 | 10/1964 | Campbell et al. _____ 18—20 |
| 3,157,911 | 11/1964 | Campbell et al. |

ROBERT F. WHITE, *Primary Examiner.*

S. A. HELLER, S. I. LANDSMAN, *Assistant Examiners.*